(12) United States Patent
Barnes

(10) Patent No.: US 10,047,892 B2
(45) Date of Patent: Aug. 14, 2018

(54) ELECTROFUSION FITTING METHODS

(71) Applicant: PIONEER LINING TECHNOLOGY LIMITED, Clydebank (GB)

(72) Inventor: Stephen Barnes, Clydebank (GB)

(73) Assignee: Pioneer Lining Technology Limited, Clydebank (GB)

( * ) Notice: Subject to any disclaimer, the term of this patent is extended or adjusted under 35 U.S.C. 154(b) by 78 days.

(21) Appl. No.: 14/906,217

(22) PCT Filed: Jul. 3, 2014

(86) PCT No.: PCT/GB2014/052024
§ 371 (c)(1),
(2) Date: Jan. 19, 2016

(87) PCT Pub. No.: WO2015/008028
PCT Pub. Date: Jan. 22, 2015

(65) Prior Publication Data
US 2016/0161039 A1    Jun. 9, 2016

(30) Foreign Application Priority Data

Jul. 18, 2013 (GB) .................................. 1312897.0

(51) Int. Cl.
*F16L 47/03* (2006.01)
*B29C 65/34* (2006.01)
(Continued)

(52) U.S. Cl.
CPC .......... *F16L 47/03* (2013.01); *B29C 65/3432* (2013.01); *B29C 65/3468* (2013.01);
(Continued)

(58) Field of Classification Search
CPC .................................................... F16L 47/03
(Continued)

(56) References Cited

U.S. PATENT DOCUMENTS

| 4,362,684 A | * | 12/1982 | Thalmann | ............... B29C 55/24 |
| | | | | 156/304.2 |
| 4,684,789 A | * | 8/1987 | Eggleston | ............. B29C 65/342 |
| | | | | 156/272.2 |

(Continued)

FOREIGN PATENT DOCUMENTS

| DE | 19545317 | 6/1997 |
| EP | 0 497 573 | 8/1992 |

(Continued)

OTHER PUBLICATIONS

Eckert, Robert, "Use of electrofusion welding in PE pipes of large nominal diameters of up to d 710 mm," 3R International, Vulkan-Verlag, Essen, Germany, vol. 43, No. 4/05, Apr. 1, 2004, pp. 245-249.

(Continued)

*Primary Examiner* — James M Hewitt, II
(74) *Attorney, Agent, or Firm* — Levy & Grandinetti

(57) ABSTRACT

The invention provides improvements to electrofusion fitting methods that allow for continuity and repeatability of welds between an electrofusion fitting and a pipe lining (or stand-alone pipe). An electrofusion fitting for joining sections of lined pipe has heating elements configured to create at least one weld between the electrofusion fitting and a pipe lining, however prior to the weld step taking place the electrofusion fitting is heated and expands accordingly to ensure contact with the pipe lining. Preheating the electrofusion fitting also provides a predetermined starting temperature for the fitting and the lining which results in improved fusion cycle reliability. Furthermore, the need for clamps or support frames to support the electrofusion fitting in situ is removed, with corresponding reductions in cycle times, complexity, and hence cost.

13 Claims, 2 Drawing Sheets

(51) Int. Cl.
B29C 65/82 (2006.01)
B29C 65/00 (2006.01)
B29K 101/12 (2006.01)
B29K 105/00 (2006.01)
F16L 58/18 (2006.01)

(52) U.S. Cl.
CPC ...... *B29C 65/8246* (2013.01); *B29C 66/0242* (2013.01); *B29C 66/1224* (2013.01); *B29C 66/5221* (2013.01); *B29C 66/72321* (2013.01); *B29C 66/91411* (2013.01); *B29C 66/91655* (2013.01); *B29C 66/91935* (2013.01); *B29C 65/342* (2013.01); *B29C 65/3476* (2013.01); *B29C 66/1142* (2013.01); *B29C 66/1222* (2013.01); *B29C 66/1282* (2013.01); *B29C 66/1286* (2013.01); *B29C 66/12842* (2013.01); *B29C 66/14* (2013.01); *B29C 66/232* (2013.01); *B29C 66/5229* (2013.01); *B29C 66/52293* (2013.01); *B29C 66/52296* (2013.01); *B29C 66/534* (2013.01); *B29C 66/612* (2013.01); *B29C 66/7392* (2013.01); *B29C 66/919* (2013.01); *B29C 66/91221* (2013.01); *B29C 66/91445* (2013.01); *B29C 66/91921* (2013.01); *B29C 66/942* (2013.01); *B29C 66/944* (2013.01); *B29C 66/949* (2013.01); *B29K 2101/12* (2013.01); *B29K 2105/258* (2013.01); *F16L 58/181* (2013.01)

(58) Field of Classification Search
USPC .............................. 285/21.1, 21.2
See application file for complete search history.

(56) References Cited

U.S. PATENT DOCUMENTS

| 4,695,335 | A | | 9/1987 | Lyall | |
|---|---|---|---|---|---|
| 5,125,690 | A | * | 6/1992 | Taylor | B29C 65/18 156/308.2 |
| 5,348,211 | A | * | 9/1994 | White | F16L 58/181 228/120 |
| 5,500,510 | A | | 3/1996 | Kumagai | |
| 7,264,279 | B2 | * | 9/2007 | Rich | B29C 65/02 156/158 |
| 2002/0130124 | A1 | | 9/2002 | Krah | |
| 2012/0043752 | A1 | * | 2/2012 | McPherson | B29C 65/542 285/21.1 |

FOREIGN PATENT DOCUMENTS

| EP | 0 535 247 | | 4/1993 | | |
|---|---|---|---|---|---|
| EP | 0924053 | | 6/1999 | | |
| JP | 0494 | | 1/1992 | | |
| JP | 0497830 | | 3/1992 | | |
| JP | 06226856 | | 8/1994 | | |
| JP | 07144368 | | 6/1995 | | |
| JP | 08187800 | | 7/1996 | | |
| JP | 1016062 | | 1/1998 | | |
| JP | 1163355 | | 3/1999 | | |
| KR | 10-1103026 | | 1/2012 | | |
| NL | 6412575 | | 5/1966 | | |
| WO | WO-2008154040 | A1 * | 12/2008 | ......... | B29C 65/3468 |
| WO | WO 2009/087565 | | 7/2009 | | |
| WO | WO 2010/041016 | | 4/2010 | | |

OTHER PUBLICATIONS

Eckert, Robert, "Joining methods of PE pipes design features for greater process reliability in resistance welded shapes," 3R International, Vulkan-Verlag, Essen, Germany, vol. 42, No. 3/04, Jan. 1, 2003, pp. 232-237.

* cited by examiner

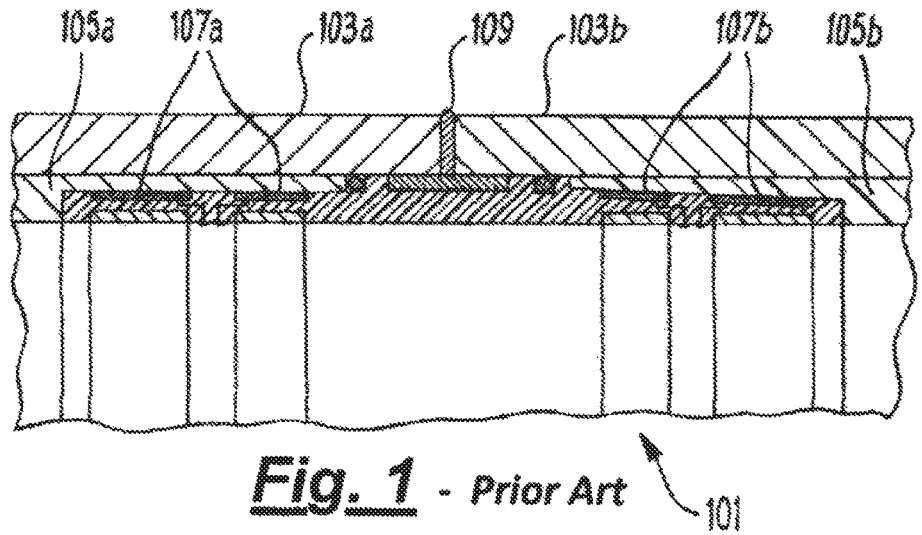
*Fig. 1* - Prior Art
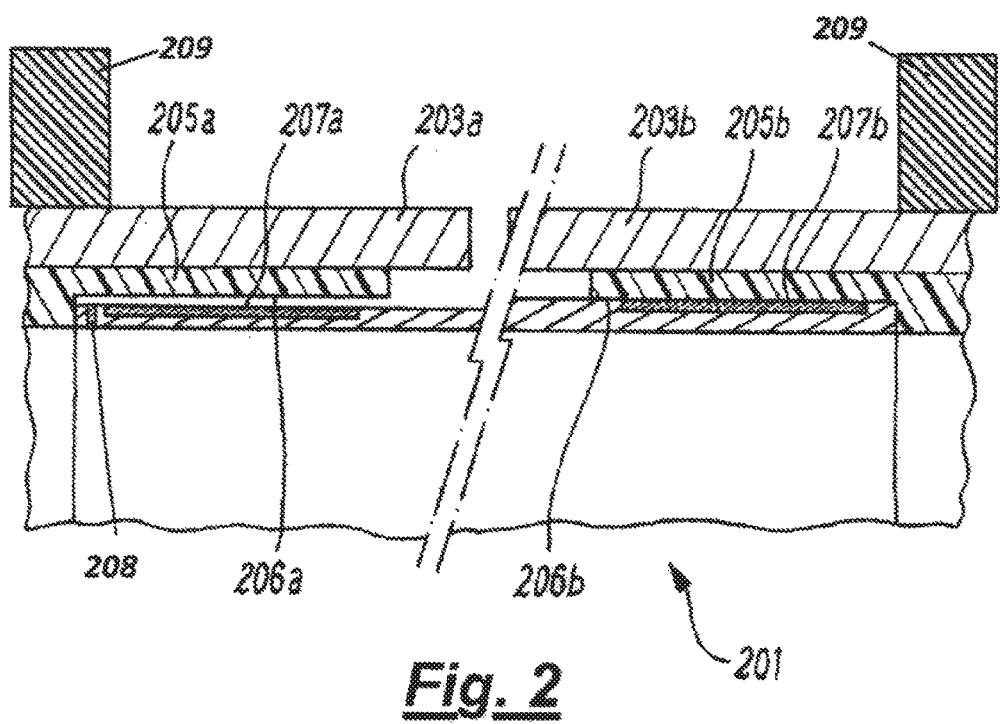
*Fig. 2*

ELECTROFUSION FITTING METHODS

The present invention relates to the field of electrofusion fittings such as employed to join sections of lined pipes. More specifically, the present invention concerns improvements to a method of joining sections of lined pipe with an electrofusion fitting that improves the quality and repeatability of joints formed there between.

BACKGROUND TO THE INVENTION

It is known that the life and performance of new and existing pipelines can be extended and optimised by lining lengths of metal pipe with polymer liners. For example, the Applicant's Swagelining® pipe lining service allows existing pipelines to be remediated and new pipelines to be provided with corrosion resistance by installing a polymer liner that remains in tight contact with the inside of a host pipe.

To join adjacent lined pipe lengths, it is known to provide an electrofusion fitting to connect the inner pipe linings prior to welding the metal pipe lengths together. The Applicant's earlier International Application Publication Number WO 2010/041016, FIG. 1 of which is reproduced in part in FIG. 1 of the present application, discloses an electrofusion fitting 101 and a method of forming a pipe joint between two lined metal pipe lengths 103a,103b incorporating such a fitting 101. The electrofusion fitting 101 is a sleeve largely comprised of a thermoplastic material and includes heating coils 107a,107b disposed at either end of the fitting 101. In use, the lining 105a is stripped back and the electrofusion fitting 101 inserted into the end of metal pipe length 103a. The heating coils 107a are then provided with electrical power which causes the fitting 101 and the lining 105a in the vicinity of the coils to melt and fuse together. The process is repeated to fuse the fitting 101 to the lining 105b of the other metal pipe length 103b, after which the metal pipe lengths themselves 103a,103b are welded together at 109.

While the effect is such that a very effective weld is formed between the fitting 101 and the pipe linings 107a, 107b, it is difficult to ensure that the fusing process can be consistently repeated.

Accordingly, it is an object of at least one aspect of the present invention to provide a method of joining sections of lined pipe using an electrofusion fitting that provides repeatable results. Embodiments of aspects of the present invention are intended to realise this object and to obviate or mitigate one or more further disadvantages of existing electrofusion fitting methods.

Further aims and objects of the invention will become apparent from reading the following description.

SUMMARY OF THE INVENTION

According to a first aspect of the invention, there is provided a method of creating a weld between a section of lined pipe and an electrofusion fitting, the method comprising heating at least a portion of the electrofusion fitting to a first temperature lower than a melting point of the material of the electrofusion fitting, and subsequently heating the at least a portion of the electrofusion fitting to a second temperature higher than the melting point of the material of the electrofusion fitting to weld the fitting to the pipe lining.

For example, the first temperature may be on the order of 50° C., and the second temperature may be on the order of 200° C.

The invention provides several advantages. Firstly, the electrofusion fitting, by virtue of the initial heating step or pre-heat, can expand to improve or ensure contact between the surface of the fitting and the pipe lining. This is particularly advantageous when two lined pipe sections are aligned for welding but there is misalignment between the liners and/or the electrofusion fitting resulting in gaps there between. Expansion of the electrofusion fitting caused by the initial heating step may compensate for this misalignment by filling any such gaps between the electrofusion fitting and the pipe linings, ensuring complete contact when the weld takes place. Secondly, the initial heating step enables the subsequent welding step to be performed from the same starting temperature (or at least a known starting temperature) of the fitting and/or the pipe lining every time—meaning that the reliability of the fusion process and the likelihood of making an acceptable weld is vastly increased. Thirdly, the Applicant has found that the initial heating step improves energy coupling into heating elements, such as copper coils, during the subsequent fusion step with a resulting drop in power consumption—particularly at the outset.

Preferably, heating to the first temperature comprises supplying electrical current to one or more heating elements integral to the electrofusion fitting. Alternatively, heating to the first temperature comprises supplying electrical current to one or more heating elements separate from the electrofusion fitting.

Preferably, heating to the second temperature comprises supplying electrical current to the same one or more heating elements as when heating to the first temperature.

Alternatively, heating to the second temperature comprises supplying electrical current to a different heating element as when heating to the first temperature.

Preferably, electrical current is supplied to one or more heating coils disposed on or near a surface of the electrofusion fitting proximal the pipe lining.

Optionally, the method comprises monitoring a temperature of the at least a portion of the electrofusion fitting. Preferably, the method comprises controlling the supply of electrical current to one or more heating elements responsive to the temperature of the at least a portion of the electrofusion fitting to control the temperature.

Preferably, the method comprises inserting the electrofusion fitting into the end of the lined pipe. Preferably, the method comprises receiving the electrofusion fitting in a recess in the end of the pipe lining. The recess is preferably formed in an inner surface of the pipe lining, but may be formed in an outer surface of the pipe lining. Optionally, the method comprises machining the electrofusion fitting to fit the recess.

Alternatively, the electrofusion fitting abuts the end of the pipe lining.

Optionally, the method further comprises inserting the electrofusion fitting into the end of a subsequent section of lined pipe, heating a corresponding portion of the electrofusion fitting to a first temperature lower than a melting point of the material of the electrofusion fitting, and subsequently heating the corresponding portion of the electrofusion fitting to a second temperature higher than the melting point of the material of the electrofusion fitting to weld the fitting to the subsequent pipe lining.

Optionally, the method comprises determining the time taken to create the first weld and heating the corresponding portion of the electrofusion fitting for a corresponding time to create the second weld.

The Applicant has developed a non-destructive way of testing the integrity of an electrofusion weld in which a channel extends at least partially through the electrofusion fitting or the pipe lining to provide fluid access to a test region between the electrofusion fitting and the pipe lining in order to leak test the weld. Accordingly, the method may further comprise performing a leak test between the electrofusion fitting and the pipe lining through a channel extending at least partially through the electrofusion fitting or the pipe lining.

This can be performed after the weld has taken place to test the integrity of the weld. However, there is a significant benefit if the leak test is performed before the weld is performed, to confirm contact between the electrofusion fitting and the pipe lining following the initial heating step. Therefore, the method may alternatively, or additionally, comprise performing the leak test before welding the fitting to the pipe lining.

According to a second aspect of the invention, there is provided an electrofusion fitting for joining sections of lined pipe, the electrofusion fitting comprising one or more heating elements disposed on a surface of the electrofusion fitting and configured to heat the electrofusion fitting to create, in use, at least one weld between the electrofusion fitting and a pipe lining, wherein the one or more heating elements are also configured to first heat the electrofusion fitting to a first predetermined temperature lower than that at which the weld is created.

Preferably, the one or more heating elements are configured to produce one or more circumferential or annular welds between the electrofusion fitting and the pipe lining.

Optionally, the electrofusion fitting further comprises one or more electrical contacts disposed on an inner surface of the electrofusion fitting and connected to the one or more heating elements through the electrofusion fitting.

Preferably, the one or more heating elements comprise at least one heating coil disposed towards an end of the electrofusion fitting. Preferably, the electrofusion fitting comprises at least one heating coil disposed at either end of the electrofusion fitting.

Alternatively, the one or more heating elements comprise at least a first heating element configured to heat the electrofusion fitting to the first predetermined temperature, and a second heating element configured to heat the electrofusion fitting to the second predetermined temperature.

Preferably, the electrofusion fitting comprises a temperature sensor. Optionally, the electrofusion fitting comprises one or more thermocouples disposed on an inner bore of the electrofusion fitting.

Preferably, the electrofusion fitting comprises a thermoplastic material. Most preferably, the electrofusion fitting comprises a cylindrical sleeve of thermoplastic material.

Preferably, the electrofusion fitting is configured for insertion into the end of a lined pipe section. Preferably, the electrofusion fitting is configured to be received in a recess in the end of the pipe lining. Preferably, the electrofusion fitting is configured to be received in a recess formed in an inner surface of the pipe lining. Alternatively, the electrofusion fitting is configured to be received in a recess formed in an outer surface of the pipe lining. Further alternatively, the electrofusion fitting is configured to abut the end of the pipe lining.

Accordingly, the heating elements are preferably arranged on an outer surface of the electrofusion fitting. Alternatively, the heating elements are arranged on an inner surface of the electrofusion fitting. Further alternatively, the heating elements are arranged on an abutting end of the electrofusion fitting.

Optionally, the electrofusion fitting is formed by an injection moulding process.

To accommodate the above-described non-destructive test of the integrity of the electrofusion weld and/or to confirm contact between the electrofusion fitting and the pipe lining prior to performing the electrofusion weld, the electrofusion fitting is preferably provided with a channel extending at least partially through the electrofusion fitting to provide fluid access to a test region between the electrofusion fitting and the pipe lining.

According to a third aspect of the invention there is provided a method of compensating for misalignment between two plastic pipes during a welding process, the method comprising inserting an electrofusion fitting into corresponding recesses in the ends of the plastic pipes, aligning the plastic pipes relative to one another, and heating corresponding portions of the electrofusion fitting to a first temperature lower than a melting point of the material of the electrofusion fitting to cause them to expand to fill the recesses.

The plastic pipes may be standalone, or may be liners of, e.g. carbon steel, host pipes in which case the host pipes are aligned prior to heating the electrofusion fitting to fill the recesses. As noted above in relation to the first aspect, expansion of the electrofusion fitting caused by the initial heating step can compensate for misalignment by filling any gaps between the electrofusion fitting and the plastic pipes, ensuring complete contact when the weld takes place.

Optionally, the method further comprises performing a leak test between the electrofusion fitting and one or both plastic pipes through a channel extending at least partially through the electrofusion fitting or one or both plastic pipes.

Embodiments of the third aspect of the invention may comprise features corresponding to the preferred or optional features of any other aspect of the invention or vice versa.

According to a fourth aspect of the invention there is provided a method of laying a pipeline, the method comprising creating at least one weld between a section of lined pipe and an electrofusion fitting in accordance with the first aspect.

Preferably, the method further comprises creating at least one further weld between a further section of lined pipe and an opposite end of the electrofusion fitting.

Embodiments of the fourth aspect of the invention may comprise features corresponding to the preferred or optional features of any other aspect of the invention or vice versa.

According to a fifth aspect of the invention, there is provided a pipeline comprising at least one section of lined pipe welded to an electrofusion fitting according to the second aspect.

According to a sixth aspect of the invention, there is provided a pipe comprising two sections of lined pipe, an electrofusion fitting and at least one weld created in accordance with the first aspect.

According to a seventh aspect of the invention, there is provided a method of closing the end of a section of lined pipe, the method comprising inserting a plug in the end of the pipe lining and heating at least a portion of the plug to a first temperature lower than a melting point of the material of the plug, and subsequently heating the at least a portion of the plug to a second temperature higher than the melting point of the material of the plug to weld the plug to the pipe lining According to an eighth aspect of the invention, there is provided a plug for closing a pipe or a lined pipe section, the plug comprising one or more heating elements disposed on a surface of the plug and configured to heat the plug to create, in use, at least one weld between the plug and a pipe lining, wherein the one or more heating elements are also configured to first heat the plug to a first predetermined temperature lower than that at which the weld is created.

Embodiments of the fifth to eighth aspects of the invention may comprise features corresponding to the preferred or optional features of the first to third aspects of the invention or vice versa.

References above to lined pipe and sections of lined pipe shall apply equally to plastic pipe and sections of plastic pipe analogous to said pipe linings. That is to say that the invention also finds utility in joining sections of standalone plastic pipes and pipe sections.

According to another aspect of the invention, there is provided an electrofusion fitting, pipe lining, pipe or method of creating a weld between an electrofusion fitting and a pipe lining or pipe, substantially as herein described with reference to the appended drawings.

BRIEF DESCRIPTION OF THE DRAWINGS

Aspects and advantages of the present invention will become apparent upon reading the following detailed description and upon reference to the following drawings (like reference numerals referring to like features) in which:

FIG. 1 is a partial reproduction of FIG. 1 of the Applicant's earlier International Application Publication Number WO 2010/041016, showing a schematic sectional view of an electrofusion fitting according to the prior art;

FIG. 2 is a schematic sectional view of an electrofusion fitting inserted into the end of a lined pipe in a weld process carried out according to an embodiment of an aspect of the present invention.

DETAILED DESCRIPTION OF PREFERRED EMBODIMENTS

Figure 3A:
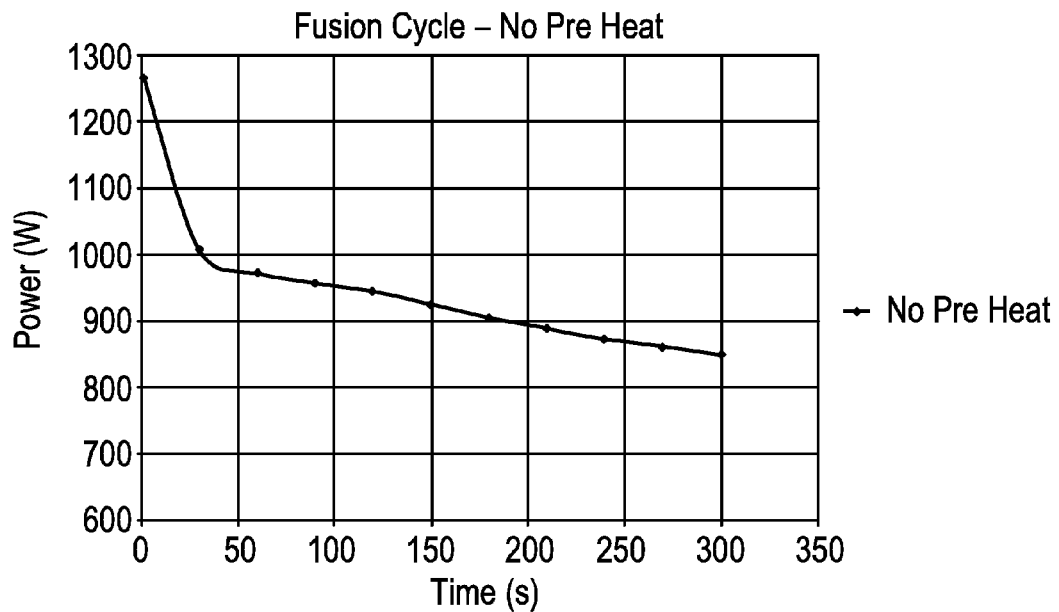
FIG. 3 illustrates the energy coupling into heating coils of an electrofusion fitting during an electrofusion weld process (a) without preheating the electrofusion fitting and (b) with preheating.

As discussed in the background to the invention above, it is difficult to ensure that an effective and consistent fusion process is carried out when connecting lined pipes or the like. An embodiment of the present invention is described below, with reference to the electrofusion fitting illustrated in FIG. 2, which overcomes this problem with the prior art.

An electrofusion fitting 201 is formed by a cylindrical sleeve of a thermoplastic material having heating coils 207a,207b disposed toward either end of the fitting 201. The electrofusion fitting 201 is shaped and sized to be inserted into the end of a lined pipe section 203a/203b and received in a recess 206a/206b in the end of the pipe lining 205a/205b. The heating coils 207a/207b are embedded in the outer surface of the fitting 201, so as to be adjacent to and facing an inner surface of the pipe lining 205a/205b, such that when provided with sufficient electrical power the thermoplastic material of the fitting 201 and of the lining 205a/205b in the vicinity of the coils melts and fuses together, thus creating circumferential or annular welds between the fitting 201 and the pipe lining 205a/205b.

FIG. 2 shows the electrofusion fitting 201 at two distinct stages that occur prior to this electrofusion process taking place; note that the scales have been exaggerated for the purposes of illustration. On the left-hand side, the electrofusion fitting 201 has just been inserted into the recess 206a in the pipe lining 205a and abuts against a shoulder formed by said recess 206a. The outer diameter of the electrofusion fitting 201 is less than the inner diameter of the recessed pipe lining 205a and as a result there is a gap between the outer surface of the electrofusion fitting 201 and the pipe lining 205a in the region where the weld will be formed.

It will also be realised that a gap between the electrofusion fitting 201 and the pipe lining 205a may be due to a misalignment between the pipe linings 205a, 205b in adjacent pipe sections 203a,203b, or specifically between the recesses 206a,206b. The gap might not be continuous or circumferential—in fact the electrofusion fitting might be in partial contact with the pipe lining 205a in the recess 206a.

The existence of a gap means that while a weld might still be formed (although it is more likely that only a partial weld will be formed) the efficiency of the weld can be compromised, and there can be significant uncertainty about the quality of the weld particularly if the gap is relatively large. Accordingly, prior to the electrofusion process being carried out and in accordance with the invention, the heating coil 207a is employed to heat the electrofusion fitting 201 to a first temperature, which is lower than a melting point of the material of the electrofusion fitting 201, at which the electrofusion fitting 201 expands and as a result reduces or removes the gap—as shown on the right-hand side of FIG. 2. This preheating step can therefore ensure that the electrofusion fitting 201 fills the recess 206b and ensures the surfaces of the electrofusion fitting 201 and the pipe lining 205b are in contact before the material is melted to actually form the weld.

Note that it is possible to check that the electrofusion fitting has filled the recess and ensure that the surfaces are in contact before the weld takes place. By providing a channel 208 extending at least partially through the electrofusion fitting 201 or the pipe lining 205b, fluid access can be provided to a test region there between. If there is a tight fitting between the electrofusion fitting 201 and the pipe lining 205b, a leak test performed on the test region via the channel will confirm this and the welding step can be performed with confidence. If the leak test fails, the fit up can be remade (by further preheating or by reworking or replacing the electrofusion fitting) until a leak test is completed successfully. The test can also be performed, via the same channel, after the weld has taken place to test the integrity of the weld.

By way of example, the preheating step might involve heating the electrofusion fitting to 50° C. for two minutes, and subsequently the welding step might involve heating the electrofusion fitting to 200° C. for five minutes.

Using an electrofusion fitting to connect two sections of lined pipe is typically carried out prior to welding together the host pipes themselves—although the steps may be performed in any order. In practice, the host pipes can be aligned ready for welding and held in place, for example using clamps 209, prior to (and during) preheating the electrofusion fitting. In this way, any internal misalignment between the electrofusion fitting and/or the pipe linings can be compensated without losing external alignment of the host pipes. This provides for an improved external weld in addition to the improved internal weld. (As noted above, the steps may be performed in any order, e.g. the host pipes may be welded together even prior to preheating the electrofusion fitting).

Furthermore, by preheating the electrofusion fitting 201 in this way, the electrofusion process by which the fitting 201 is welded to the pipe lining 205a/205b can start from a pre-determined temperature which means that the electrofusion process can be predictably and reliably performed. Much of the concern surrounding reliability of electrofusion welds stems from uncertainty around various parameters than can vary greatly from one process to the next. By providing a consistent start point for all electrofusion welding processes, continuity between subsequent electrofusion processes can be ensured. To this end, the temperature may be monitored as part of the electrofusion process.

In addition, the preheating step avoids the need to provide internal physical support to the electrofusion fitting during the subsequent electrofusion process (for example, using a clamp or support frame) because the expanded fitting can fill the recess and therefore retain and support itself. The use of clamps or support frames is known to add complexity and extend the process cycle time, and as a result increase expense, without the increase in confidence that a satisfactory (and consistent) weld has been performed that the present invention provides. In short, the present invention reduces cost and complexity while increasing confidence in both the joining of the linings and of the host pipes themselves.

Typically, a fusion cycle will be developed for a known set of conditions. For example it may be determined that, at an ambient temperature of 20° C., supplying a known electrical current to the heating coils for six minutes is sufficient for the thermoplastic material of the fitting 201 and of the lining 205a/205b in the vicinity of the coils to melt and fuse together effectively. However, in the field, the ambient temperature may for example be 6° C. in which case it is possible that the weld will not be formed effectively with only a six minute fusion cycle. One solution would be to have a calibration table or the like to refer to. However, the present invention provides a more elegant solution in which a predetermined starting temperature is set by preheating the electrofusion fitting (and optionally the pipe lining) which means that the actual parameters that have been approved or qualified for a particular operation can be reliably and repeatably delivered in the field, with predictable results. However, a calibration table or look-up chart might still be employed.

As described above, the Applicant has also discovered that preheating the electrofusion fitting prior to performing the electrofusion step results in improved energy coupling into the heating coils. While the energy requirements of a single electrofusion process might only be reduced by a modest amount—a pipelay operation for example might involve several hundred electrofusion fittings and so the energy saving benefits will be cumulative.

Figure 3B:
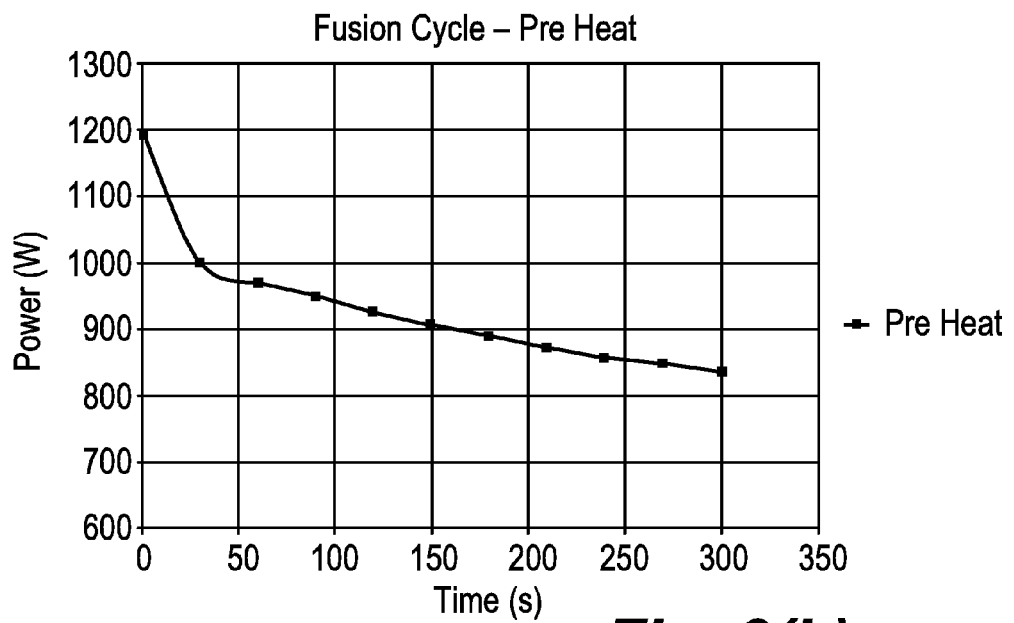

FIGS. 3(a) and 3(b) illustrate the power consumption during a fusion cycle (a) without a preheating step and (b) with a preheating step. In this particular example, the initial power consumption can be seen to be approx. 75 W lower in the fusion cycle comprising the preheating step. Based on models the Applicant anticipates that in low temperature operations (where the starting temperature without preheat may be significantly lower than with preheat) and/or when employing larger electrofusion fittings, the difference in power consumption will be significantly magnified.

It will of course be understood that while the present invention has been illustrated with reference to electrofusion fittings for joining lined pipe sections, such an electrofusion fitting can be employed to join standalone plastic pipes, or indeed to provide a plug or to blank off the end of a lined pipe section or standalone plastic pipe. Furthermore, while heating elements are described as embedded in a surface of the electrofusion fitting, the heating elements may be disposed elsewhere in the electrofusion fitting or even applied externally.

The invention provides improvements to electrofusion fitting methods that allow for continuity and repeatability of welds between an electrofusion fitting and a pipe lining (or stand-alone pipe). An electrofusion fitting for joining sections of lined pipe has heating elements configured to create at least one weld between the electrofusion fitting and a pipe lining, however prior to the weld step taking place the electrofusion fitting is heated and expands accordingly to ensure contact with the pipe lining. Preheating the electrofusion fitting also provides a predetermined starting temperature for the fitting and the lining which results in improved fusion cycle reliability. Furthermore, the need for clamps or support frames to support the electrofusion fitting in situ is removed, with corresponding reductions in cycle times, complexity, and hence cost.

Throughout the specification, unless the context demands otherwise, the terms 'comprise' or 'include', or variations such as 'comprises' or 'comprising', 'includes' or 'including' will be understood to imply the inclusion of a stated integer or group of integers, but not the exclusion of any other integer or group of integers.

The foregoing description of the invention has been presented for the purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A method of compensating for misalignment between two plastic pipe linings comprised in host pipes during a welding process, the method comprising inserting an electrofusion fitting into corresponding recesses in the ends of the plastic pipe linings, aligning the host pipes relative to one another, and heating corresponding portions of the electrofusion fitting to a first temperature lower than a melting point of the material of the electrofusion fitting, while the host pipes are held in place, to cause the portions of the electrofusion fitting to expand to fill the recesses, wherein the electrofusion fitting, once expanded, retains and supports itself during welding to the pipe linings.

2. The method according to claim 1, further comprising heating corresponding portions of the electrofusion fitting to a second temperature higher than the melting point of the material of the electrofusion fitting to weld the fitting to the pipe linings.

3. The method according to claim 1, further comprising performing a leak test between the electrofusion fitting and one or both plastic pipes through a channel extending at least partially through the electrofusion fitting or one or both pipe linings.

4. The method according to claim 3, wherein the leak test is performed before welding the fitting to the pipe linings.

5. The method according to claim 1, wherein the host pipes are held in place using clamps.

6. The method according to claim 1, further comprising welding the host pipes together.

7. The method according to claim 6, wherein the host pipes are welded together prior to preheating the electrofusion fitting.

8. The method according to claim 1, wherein heating to the first temperature comprises supplying electrical current to one or more heating elements integral to the electrofusion fitting.

9. The method according to claim 8, wherein heating to the second temperature comprises supplying electrical current to the same one or more heating elements as when heating to the first temperature.

10. The method according to claim 8, wherein heating to the second temperature comprises supplying electrical current to a different heating element as when heating to the first temperature.

11. The method according to claim 1, wherein the method comprises monitoring a temperature of the portions of the electrofusion fitting being heated.

12. The method according to claim 11, wherein the method comprises controlling the supply of electrical current to one or more heating elements responsive to the temperature of the portions of the electrofusion fitting to control the temperature of the portions of the electrofusion fitting.

13. The method according to claim 1, comprising forming the recesses in the ends of the pipe linings.

* * * * *